July 4, 1950        C. NELSON        2,513,350
PRESSURE COOKER
Filed March 3, 1945        2 Sheets-Sheet 1
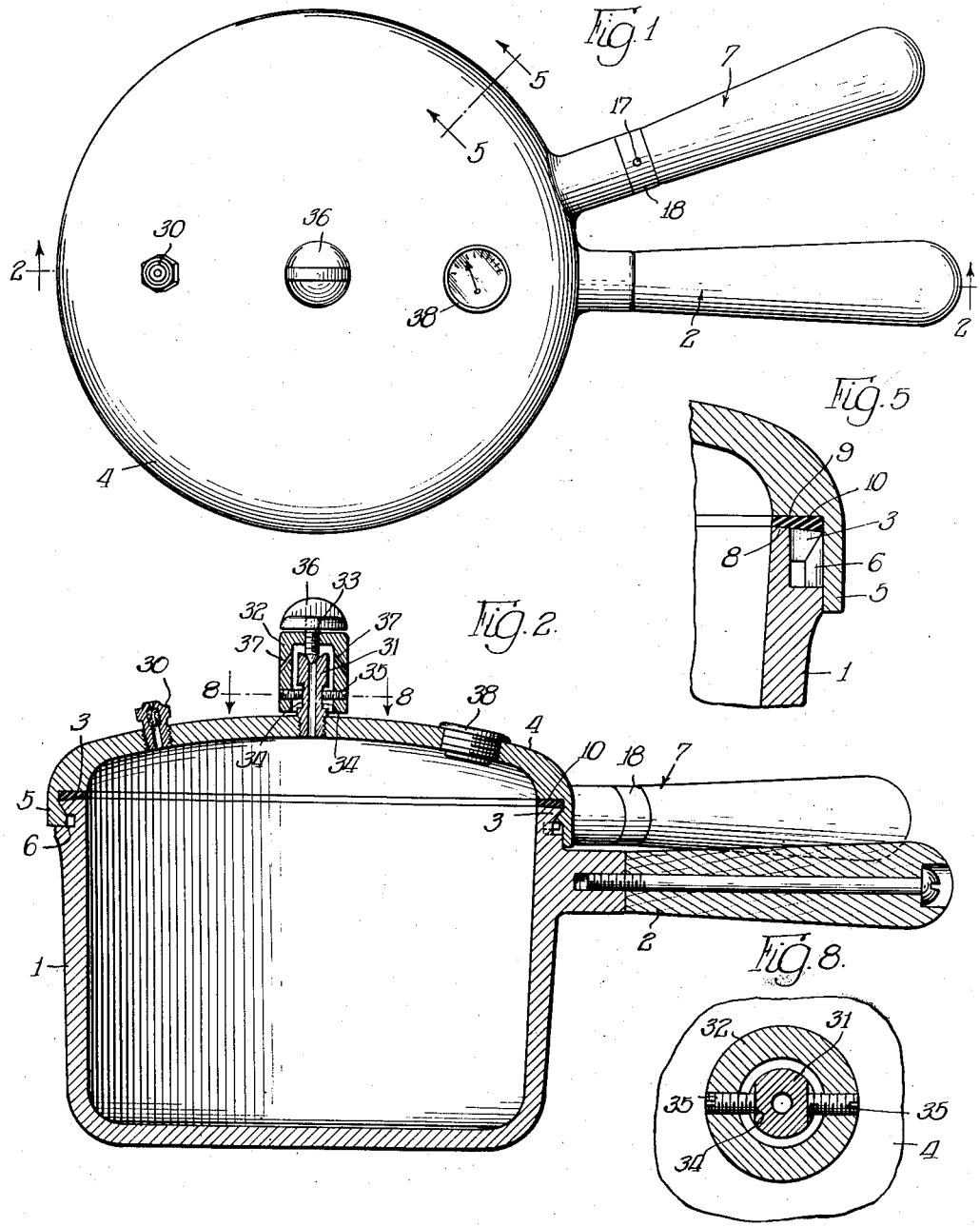
INVENTOR.
Carl Nelson,
BY George H. Simmons
Atty.

July 4, 1950 — C. NELSON — 2,513,350
PRESSURE COOKER
Filed March 3, 1945 — 2 Sheets-Sheet 2
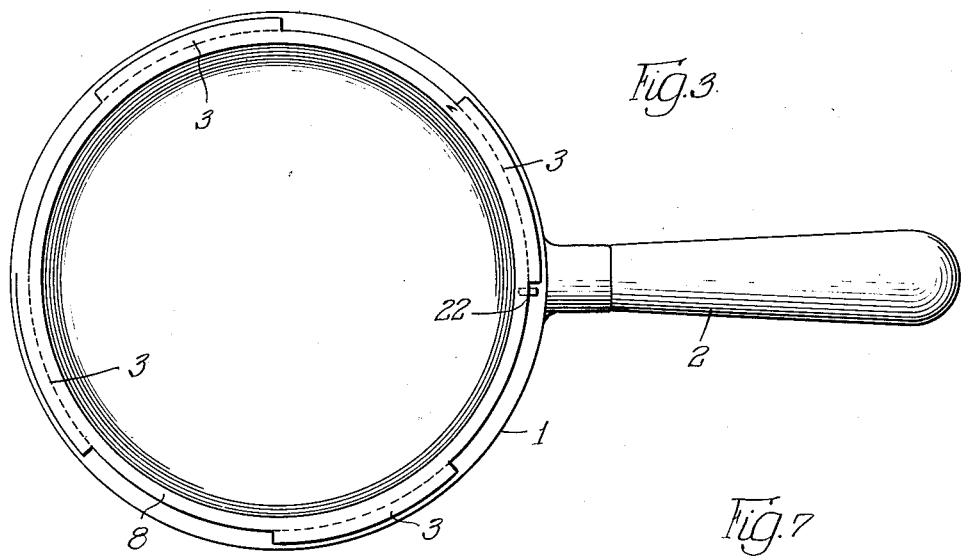
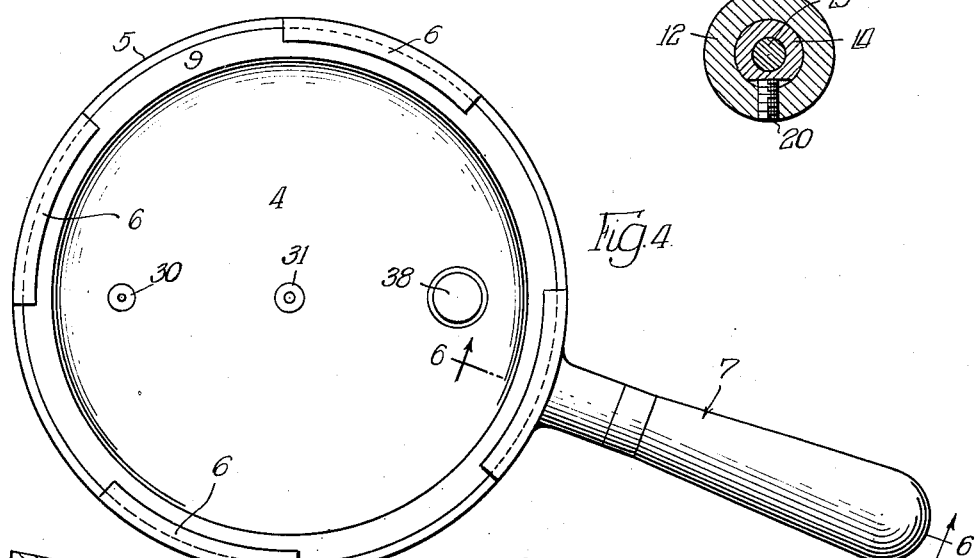
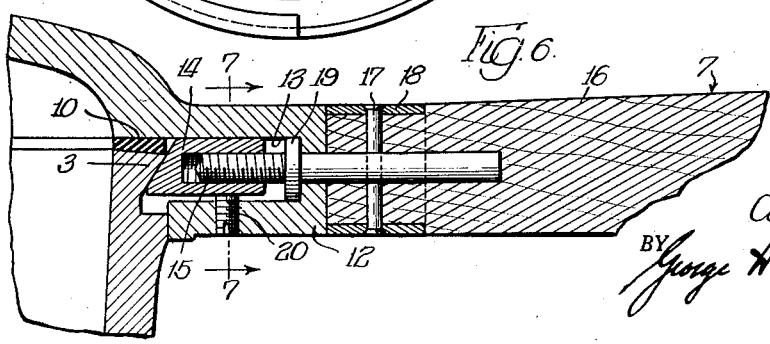
INVENTOR.
Carl Nelson,
BY George H. Simmons Patented July 4, 1950

2,513,350

UNITED STATES PATENT OFFICE 2,513,350

PRESSURE COOKER

Carl Nelson, Eau Claire, Wis., assignor, by mesne assignments, to Speed-Meal Corporation, Racine, Wis., a corporation of Delaware Application March 3, 1945, Serial No. 580,755

5 Claims. (Cl. 220—55)

This invention relates to pressure cookers and has for its principal object a new and improved device of this kind.

It is a main object of the invention to provide a pressure cooker that may be used with safety by inexperienced and unskilled people.

Another object of the invention is to provide a pressure cooker in which the cover is mechanically secured on a cooking vessel by one distinct operation and sealed to make the vessel pressure tight by a second and distinct operation.

Still another object of the invention is to provide a pressure cooker in which, when the vessel is sealed pressure tight, the cover is mechanically locked and cannot be removed until the seal has been broken to allow the pressure to escape.

Still another object of the invention is to provide a new and improved safety valve for domestic type pressure cookers.

A further object of the invention is to provide a pressure cooker that can be kept clean and sanitary.

A still further object of the invention is to provide a pressure cooker that can be economically manufactured as a sturdy, attractive, sanitary unit that can be operated with safety, and with simple manipulation.

Further objects of the invention not specifically mentioned here will be apparent from the detailed description and claims which follow, reference being had to the accompanying drawings in which a preferred embodiment of the invention is shown by way of example, and in which:

Figure 1 is a top side plan view of the preferred embodiment of the invention, closed, ready for use;

Figure 2 is a cross sectional view taken along the line 2—2 Figure 1, looking in the direction of the arrows;

Figure 3 is a top side plan view of the vessel with the cover removed;

Figure 4 is a bottom side plan view of the cover;

Figure 5 is a fragmentary cross sectional view taken substantially along the line 5—5 of Figure 1 looking in the direction of the arrows;

Figure 6 is a fragmentary cross sectional view taken substantially along the line 6—6 of Figure 4, looking in the direction of the arrows;

Figure 7 is a cross sectional view along the line 7—7 of Figure 6; and

Figure 8 is a fragmentary cross sectional view taken along the line 8—8 of Figure 2, looking in the direction of the arrows.

Domestic type pressure cookers adapted to operate under a working pressure of approximately 15 pounds to the square inch are old in the prior art, of which I am aware. Certain of these prior art devices are what is known as saucepan type cookers, in which a cooking vessel of two or four quart capacity has been provided with a pressure type lid to form the cooker. Both the vessel and the lid have been provided with handles to facilitate removing the cooker from a stove. Other prior art devices, usually of larger capacity, have been constructed along the same general principles with such changes of design as required by the increase in size of the unit.

These prior art devices, although constructed so as to be capable of safe manipulation, have frequently been so faultily handled that accidents have occurred. One of the most common causes of accidents has been releasing the cover of the cooker from the vessel while pressure is still within the vessel, with a result that covers have been blown off with sufficient force to cause serious injury and damage.

The present invention seeks to remedy this condition by providing a pressure cooker in which it is impossible to remove the cover from the vessel before the pressure in the cooker has been released.

In the preferred embodiment of the invention the vessel is provided with outwardly extending lugs circumferentially spaced around its upper edge. The cover is provided with inwardly projecting circumferentially spaced lugs permitting the cover to be secured on the vessel by first being placed so that the lugs on the cover will slide past the lugs on the vessel, after which the cover is rotated to register the two lugs together forming the usual bayonet type of connection. Sealing surfaces are provided on the cover and vessel with a suitable gasket interposed therebetween, these sealing surfaces or rings being so located that the vessel is not sealed by the rotation of the cover to secure it thereon. A separate and distinct operation which moves the cover in a translatory movement downwardly on the vessel is employed to form a pressure tight seal. Preferably this translatory movement is accomplished by forming the engaging surfaces of the lugs on the vessel and cover as sections of a right circular cone disposed with its apex coinciding with the center of the vessel at a point below the lugs. One of the lugs on the cover is provided with a wedge having a tapered surface adapted to engage the surface of the lug on the vessel so that as the wedge is forced toward the vessel the cover will be drawn down tightly thereon. The engagement of the wedge with the lug on the vessel serves also to lock the cover against rotation, making it impossible to remove the cover before the wedge has been withdrawn and the seal broken.

Prior art pressure cookers, of which I am aware, have usually been provided with a safety valve consisting of a valve stem threaded into the cover and over which a weighted cap has been placed. This cap carries a valve member which seats on the valve stem to seal the vessel, the weight of the cap being proportioned with respect to the area of the valve member to enable the weight to maintain the valve closed under the normal working pressure in the cooker and to open when that pressure is exceeded. While it is possible to release the pressure in the cooker by lifting the valve from the stem, such practice is dangerous since it allows a sudden escape of the steam and the danger of the housewife being burned by this escaping steam is very great.

In the preferred embodiment of the present invention an improved safety valve is employed. The weighted cap is secured on the stem so that it cannot be removed to permit sudden escape of the steam. The valve member is threaded through this cap and provided with a knob or handle by which it may be rotated to back it away from the valve seat and thereby permit gradual escape of the steam from the vessel. Ports are provided in the cap to direct this steam downwardly over the cover of the vessel and away from the hand of the housewife. Should it be desired to remove the cap to clean it, the retaining screws can be easily loosened and the cap lifted off of the cover.

Referring now to the drawings in more detail: in the embodiment shown by way of example, the invention is applied to a saucepan type cooker which consists of a cooking vessel 1 that is provided with a handle 2 and with outwardly extending lugs 3 disposed near the open face of the vessel. As shown, four lugs 3 are provided, but it will be apparent that a greater or lesser number of lugs may be employed. The cover 4 has a downwardly depending flange 5 from which are four inwardly projecting lugs 6 that are adapted to be engaged with the lugs 3 to secure the cover on the vessel. Cover 4 is provided with a handle 7.

As will be seen best in Figures 2 and 5, the surfaces of the lugs 3 that are to be engaged by the lugs 6, that is the outer under surfaces of the lugs, are formed as sections of a right circular cone whose apex is disposed beneath the lugs. In the embodiment shown this apex falls beneath the bottom of the vessel. The upper surfaces of the lugs 6 on the cover are also formed as sections of a right circular cone so that the engaging surfaces of the two lugs register accurately with each other.

The upper surface of the vessel 1 within the lugs 3 is tapered slightly, as shown at 8 Figure 5, to form a sealing ring. A flat shoulder 9 on the cover forms a second sealing ring and a gasket 10 is interposed between these rings. Preferably the gasket 10 is composed of a resilient material such as rubber, and is of such thickness that when lugs 3 and 6 are registered together as above, sealing rings 8 and 9 do not compress the gasket and a pressure tight seal is not formed.

As will be seen best in Figure 6, the handle 7 of the cover comprises a generally cylindrical boss 12 projecting from the flange of the cover and containing a generally cylindrical cavity 13 in which is disposed a wedge 14 that is mounted upon a screw 15 that projects through the end of the boss 12 and into a handle 16. This handle 16 is composed of a non-heat conducting material such as wood or fibre, and is held on the screw 15 by suitable means such as a rivet 17 that extends through a ferrule 18 on the handle. Screw 15 is provided with a collar 19 that abuts against the closed end of the boss 12 to secure the handle on the cover.

Wedge 14 is held against rotation in any preferred manner such as by a screw 20 extended through the boss 12 and engaging a flattened surface on the wedge. As the handle is rotated the wedge will be moved into and out of the socket 13 in which it is contained. Preferably screw 15 is a left handed screw so that turning the handle 16 to the right will force the wedge out of its recess and against the lug 3 on the vessel, thereby to move the cover downwardly and seal the vessel. Turning the handle 16 to the left will withdraw the wedge to break the seal and permit removal of the cover from the vessel.

It will be noted in Figure 3 that the lugs 3 are spaced so that the axis of the generally cylindrical handle 2 extends through the ends of two of the lugs. It will be noted in Figure 4 that the axis of the handle 7 on the cover bisects two of the lugs 6 thereon. The vessel is provided with a stop pin 22 against which one end of the lug 6 nearest the handle of the cover strikes to prevent further rotation of the cover with respect to the vessel. As will be seen in Figure 1 this rotation is stopped with the handles 2 and 7 spaced apart approximately thirty degrees. In the prior art vessels of this type, the two handles have been practically aligned with each other when the cover has been sealed on the vessel, with the result that the handle so formed by the two members has been so big that the housewife has not been able to secure a firm grasp on it, and accidents have occurred in removing the cooker from the stove. By spacing the handles apart as shown in Figure 1, the housewife can grasp one handle in each hand and thereby secure a good hold on the cooker to permit its safe removal from the stove. Moreover, the manipulation of the handle 7 to seal the cooker is facilitated by this arrangement.

In Figure 2 handle 2 extends radially from the vessel 1 and is disposed in a plane below handle 7. It is contemplated that in certain instances both handles 2 and 7 will be disposed in the same horizontal plane. This may be accomplished by extending the boss to which handle 2 is secured, upwardly and outwardly sufficiently to raise handle 2 into the horizontal plane through handle 7.

Since the cover, when it is sealed on the vessel, is mechanically locked thereon by the action of wedge 14 and the frictional engagement of the lugs 3 and 6, the danger of the cover being unfastened mechanically from the vessel before the pressure is released is eliminated. The act of withdrawing the wedge to unlock the cover breaks the seal to release the pressure from within the vessel, and this pressure will escape long before the cover can be rotated to disengage lugs 3 and 6.

The safety features of the device shown are further augmented by the inclusion in the cover of a suitable safety plug 30, which may comprise a holder containing a low melt point material, such as Wood's metal, calibrated to melt at a temperature slightly above the temperature corresponding to the normal operating pressure. The cover is also provided with a safety valve stem 31 over which is fitted a weighted cap 32, through the closed end of which is extended a screw 33 that forms with the stem 31 a valve that will remain closed against the normal operating pressure of the cooker.

Preferably stem 31 is generally cylindrical in shape and is provided with grooves 34 which are engaged by a wrench to screw the stem into the cover. Cap 32 carries stud screws 35 which project into grooves 34 to prevent the cap from turning on the stem and to prevent the cap from being removed from the stem. Screw 33 is provided with a suitable knob or handle 36 by which it may be rotated. Normally, screw 33 is as shown in Figure 2, that is, screwed all the way through the cap to bring the knob down on the upper surface of the cap. In this position screw 33 engages a seat in the valve stem to seal the vessel and raises cap 32 up off of the upper surface of the cover. The weight of the cap is proportioned to the area of the screw 33 engaged by the pressure in the vessel so that the cap will maintain the vessel seated against the normal working pressure. A higher pressure will unseat the valve and allow the excess steam to escape.

When it is desired to manually release the pressure from the vessel, knob 36 is rotated to back screw 33 out of the cap. The initial portion of the movement will lower cap 32 onto the upper surface of the cover and continued movement will raise screw 33 off of the valve stem and the steam in the vessel allowed to escape. Cap 32 is preferably provided with ports 37 extending downwardly and outwardly therefrom to direct escaping steam away from the knob, thereby to lessen the chances of burning the hand of the housewife. The rate of escape of the steam can be controlled by manipulation of the screw 33.

The cover may also be provided with a suitable indicator 38 calibrated to indicate pressure or temperature—or both.

In certain prior art pressure cookers of this type, of which I am aware, the sealing member corresponding to gasket 10 has been permanently fixed in the cover, with the result that it has been difficult, if not impossible, to keep the vessel and cover clean and sanitary. In the embodiment shown in the drawings gasket 10 is loosely fitted in the cover and is held against sealing ring 9 merely by the engagement of the gasket with the lugs 6 on the cover. The gasket may be readily removed to permit thorough scrubbing and sterilization of the cover as required, and with the gasket removed from the cover it can be thoroughly cleansed so that the cooker may be easily maintained in a scrupulously clean and sanitary condition.

The cooker shown in the drawings by way of example is relatively low in comparison to its horizontal dimensions and is not likely to be tipped over readily when in use on a stove. The teachings of the invention, however, may be equally well applied to larger and taller types of cookers, such as are commonly employed in home canning of fruits and vegetables. In these larger devices both the vessel and the cover are usually provided with two handles instead of the one shown by way of example.

Pressure cookers built in accordance with the teachings of the present invention are possessed of many advantages. The cover is mechanically secured on the vessel by a rotary movement that is definitely stopped prior to the forming of a pressure tight seal. The gasket by which this sealing is formed is clamped by a translatory movement of the cover with respect to the vessel, a movement which seals the vessel without any sliding movement of the gasket with respect to the cover or vessel—or both—and consequently the life of the sealing gasket is prolonged. The operation of sealing the vessel mechanically locks the cover thereon so that it is impossible to rotate the cover thereby to remove it from the vessel before the seal has been broken and the pressure allowed to escape. The improved safety valve of the present invention serves also as a pet cock which permits release of the pressure prior to breaking the seal, this release of pressure being accomplished without building up in the safety valve pressures which are likely to blow it off of the cooker. The cooker can be built as a sturdy unit of pleasing appearance, at low cost, and the unit is capable of being kept clean and sanitary.

While I have chosen to show my invention by illustrating and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent, is pointed out in the appended claims.

What is claimed is:

1. In a pressure cooker in which a cover is mechanically held on a vessel by circumferentially spaced lugs on the cover which are rotated into engagement with similar lugs on the vessel, the lugs on the cover engaging the lugs on the vessel along surfaces beveled downwardly and inwardly, a handle on the cover for rotating the cover with respect to said vessel, said handle being rotatable around its own axis, and a wedge on the cover moved into engagement with a lug on the vessel by a rotation of said handle to lock the cover against rotation with respect to the vessel.

2. In combination, a cooking vessel having an open top, circumferentially spaced lugs projecting outwardly from said vessel, a generally cylindrical handle projecting outwardly from the vessel and disposed with the axis of the handle extending through one end of one of said lugs, a cover for said vessel, circumferentially spaced lugs projecting inwardly of said cover, a generally cylindrical handle projecting outwardly from the cover and disposed with the axis of the handle coinciding with the median line of one of said cover lugs, stop means on the vessel for limiting rotation of the cover with respect to the vessel at a point at which the lugs on the cover coincide with the lugs on the vessel and the handles are spaced apart, said handle on the cover being rotatable about its axis, and a wedge in the cover moved by a rotation of the handle into engagement with the vessel to lock the cover against rotation with respect to the vessel.

3. In a pressure cooker in which a cover is mechanically held on a vessel by lugs on the cover which are rotated into engagement with lugs on the vessel, beveled engaging surfaces on said lugs formed as sections of a right circular cone whose apex is disposed on the center line of the vessel and below the lugs, a wedge carried by the cover, means for forcing said wedge into engagement with the beveled surface of one of the lugs on the vessel thereby to draw the cover down onto the vessel in a translatory movement, and means actuated by said translatory movement of the cover for forming a pressure tight seal between the cover and vessel.

4. In a pressure cooker, or vessel having an open top surrounded by a sealing ring, lugs projecting outwardly from said vessel, the lower surfaces of said lugs being sections of a right circular cone whose apex is located on the median line of said vessel and below the bottom thereof, a cover adapted to fit over said vessel, lugs on said cover, the upper surfaces of said lugs being also sections of a right circular cone, said upper surfaces registering with said lower surfaces as the cover is rotated with respect to the vessel to secure the cover on the vessel, a sealing ring in the cover disposed in juxtaposition to the sealing ring on the vessel when the cover is secured on the vessel, a gasket carried by the cover and interposed between said sealing rings, and wedge means for moving said cover toward said vessel in translatory movement to clamp said sealing rings together on said gasket and seal the cover on the vessel.

5. In a pressure cooker, or vessel having an open top surrounded by a sealing ring, lugs projecting outwardly from said vessel, the lower surfaces of said lugs being sections of a right circular cone whose apex is located on the median line of said vessel and below the bottom thereof, a cover adapted to fit over said vessel, lugs on said cover, the upper surfaces of said lugs being also sections of a right circular cone, said upper surfaces registering with said lower surfaces as the cover is rotated with respect to the vessel to secure the cover on the vessel, a sealing ring in the cover disposed in juxtaposition to the sealing ring on the vessel when the cover is secured on the vessel, a gasket carried by the cover and interposed between said sealing rings, and wedge means on the cover engaging the conical surface on one of the lugs on the vessel for forcing the other cover lugs downwardly on the conical surfaces of the other vessel lugs thereby to clamp said sealing rings together on said gasket and seal the cover on the vessel.

CARL NELSON.

REFERENCES CITED

The following references are of record in the file of this patent:

UNITED STATES PATENTS

| Number | Name | Date |
| --- | --- | --- |
| 1,361,946 | Whitaker | Dec. 14, 1920 |
| 1,515,184 | Waggoner | Nov. 11, 1924 |
| 1,706,051 | Auchincloss | Mar. 19, 1929 |
| 2,147,727 | White et al. | Feb. 21, 1939 |
| 2,218,188 | Wittenberg | Oct. 15, 1940 |
| 2,334,448 | Sheridan | Nov. 16, 1943 |
| 2,436,566 | Goldberg | Feb. 24, 1948 |